United States Patent [19]

Takei et al.

[11] Patent Number: 4,858,037

[45] Date of Patent: Aug. 15, 1989

[54] INFORMATION SIGNAL RECORDING AND/OR REPRODUCING APPARATUS

[75] Inventors: Masahiro Takei; Toshiyuki Masui, both of Kanagawa; Motokazu Kashida, Tokyo; Kouji Takahashi, Kanagawa, all of Japan

[73] Assignee: Canon Kabushiki Kaisha, Tokyo, Japan

[21] Appl. No.: 850,974

[22] Filed: Apr. 11, 1986

[30] Foreign Application Priority Data

Apr. 13, 1985 [JP] Japan .................................. 60-077575
Apr. 13, 1985 [JP] Japan .................................. 60-077576
Apr. 13, 1985 [JP] Japan .................................. 60-077577

[51] Int. Cl.⁴ .......................... G11B 15/14; G11B 5/02
[52] U.S. Cl. ......................................... 360/60; 360/27
[58] Field of Search .................... 360/27, 60, 32, 74.4, 360/48

[56] References Cited

U.S. PATENT DOCUMENTS

| | | | |
|---|---|---|---|
| 4,389,681 | 6/1983 | Tanaka et al. | 360/27 |
| 4,542,419 | 9/1985 | Morio et al. | 360/32 |
| 4,562,489 | 12/1985 | Gaskell et al. | 360/27 |

Primary Examiner—Vincent P. Canney
Attorney, Agent, or Firm—Robin, Blecker & Daley

[57] ABSTRACT

In an information recording and/or reproducing apparatus for recording and/or reproducing a main information signal in or from each of a plurality of areas extending in the longitudinal direction of a tape-shaped recording medium, an additinal information signal which releates to all the signals recorded in the plurality of areas is recorded, separately from the plurality of areas, in a recording track formed on the medium in the longitudinal direction thereof.

13 Claims, 8 Drawing Sheets

INFORMATION SIGNAL RECORDING AND/OR REPRODUCING APPARATUS

BACKGROUND OF THE INVENTION

1. Field of the Invention

This invention relates to an information signal recording and/or reproducing apparatus and more particularly to an apparatus arranged to record and/or reproduce a main information signal, in or from each of a plurality of areas extending in the longitudinal direction of a tape shaped recording medium.

1. Description of the Prior Art

It has recently become a trend in the field of magnetic recording in general to increase the density of recording. Video tape recorders (hereinafter referred to as VTR) are of no exception and have come to be arranged to perform magnetic recording in increased density with the tape allowed to travel at a lower speed. However, the conventional use of a fixed head for audio signal recording deteriorates the reproduced sound quality as it is impossible to have a sufficiently high relative speed with the fixed head. In a method contrived for the solution of this problem, the length of recording tracks to be formed with a rotary head is arranged to be longer than the conventional length to give room for recording audio signals one after another.

Figure 1:
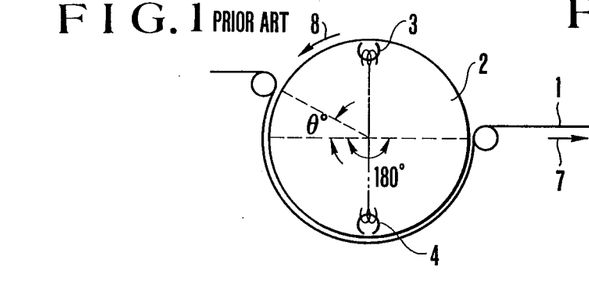
FIG. 1 is a schematic illustration of the tape transport system of the conventional VTR.
Figure 2:
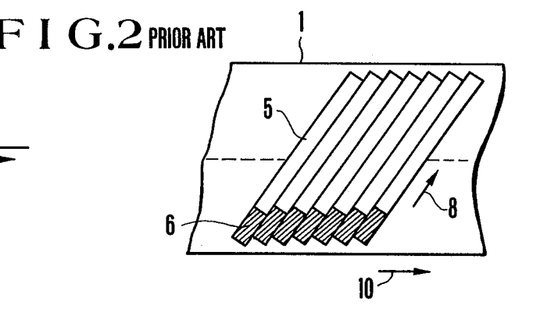
FIG. 2 is an illustration of recording tracks formed on a tape shown in FIG. 1.

FIG. 1 of the accompanying drawings shows the tape transport system of a VTR which is arranged according to the above-stated prior art method. FIG. 2 shows the recording tracks formed on a magnetic tape by the VTR of FIG. 1. These illustrations include a magnetic tape 1 (hereinafter referred to as the tape); a rotary cylinder 2; magnetic heads 3 and 4 (hereinafter referred to as heads) which are mounted on the cylinder 2 at a phase difference of 180° degrees and are arranged to have different azimuth angles from each other; video signal recording areas 5 of recording tracks formed on the tape 1; and audio signal recording areas which are also formed in these tracks. The video area 5 is a part of the track traced by the heads 3 and 4 with the rotary cylinder 2 turned 180° degrees. The audio area 6 is a part of the track traced by the heads 3 and 4 with the rotary cylinder 2 turned to a degree $\theta°$. With an audio signal which is PCM processed and time-base compressed recorded in the audio area 6 in the above-stated manner, it can be reproduced in a fairly high sound quality favorably comparing with the sound quality of an analog signal recorded and reproduced by an audio dedicated apparatus.

Figure 3:
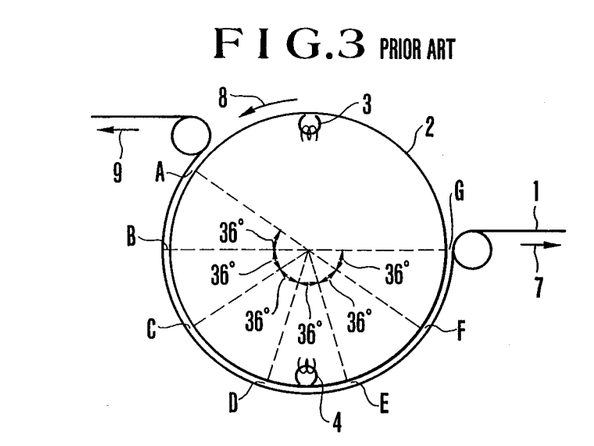
FIG. 3 is an illustration of the tape transport system of the conventional multi-channel recorder.
Figure 4:
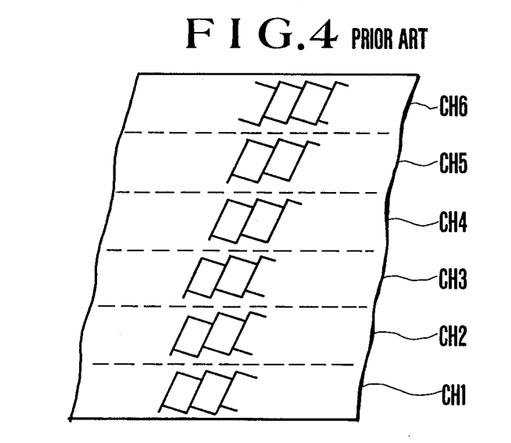
FIG. 4 is an illustration of recording tracks formed by the recorder of FIG. 3 on a tape.

Meanwhile, there has been proposed another method, in which a VTR is arranged to record another audio signal also in the video area 5. According to this method, with the angle $\theta$ for one area assumed to be 36 degrees, five more areas which are similar to the audio area 6 are obtainable within the turning degree of 180° of the rotary head in addition to the audio area 6. Then, with audio signals which are separately time-base compressed allowed to be respectively recorded in these areas, the VTR can be arranged to serve as an audio dedicated tape recorder which is capable of recording audio signals in six channels. The following is a brief description of this tape recorder:

The tape transport system of the tape recorder mentioned above is arranged as shown in FIG. 3. Recording tracks formed on the tape by this tape recorder are as shown in FIG. 4. In these drawings, the same parts as those shown in FIGS. 1 and 2 are indicated by the same reference numerals. Referring to FIG. 4, while the head 3 or 4 is tracing the tape from a point A to a point B, from the point B to a point C, from the point C to a point D, from the point D to a point E, from the point E to a point F and from the point F to another point G as shown in FIG. 3, the audio signals are recorded in areas CH1 to CH6. Each of these areas is usable for recording an audio signal separately from another. Each of these areas is also arranged to have the so-called azimuth overlapped writing performed thereon. However, the recording tracks within each of the areas CH1 to CH6 do not have to be on one and the same straight line. Further, a tracking control pilot signal is recorded in each area. However, these pilot signals are recorded in these areas without any correlation with each other.

In the case of this tape recorder (hereinafter referred to as a multi-channel tape recorder), recording and reproduction can be performed either solely in the forward travelling direction of the tape (for example, in the direction of arrow 7 of FIG. 3) or, if so desired, alternately in opposite directions. For example, referring to FIG. 4, recording or reproduction is performed in or from the areas CH1 to CH3 while the tape is allowed to travel in the direction of arrow 7 and in or from the areas CH4 to CH6 while the tape is travelling in the direction of arrow 9. In that instance, the inclination of the tracks in the areas CH1 to CH3 somewhat differs from that of the tracks formed in the areas CH4 to CH6. However, the difference between the two directions in the relative speed presents no problem as the travelling speed of the tape 1 is extremely low as compared with the turning speed of the heads 3 and 4.

Figure 5:
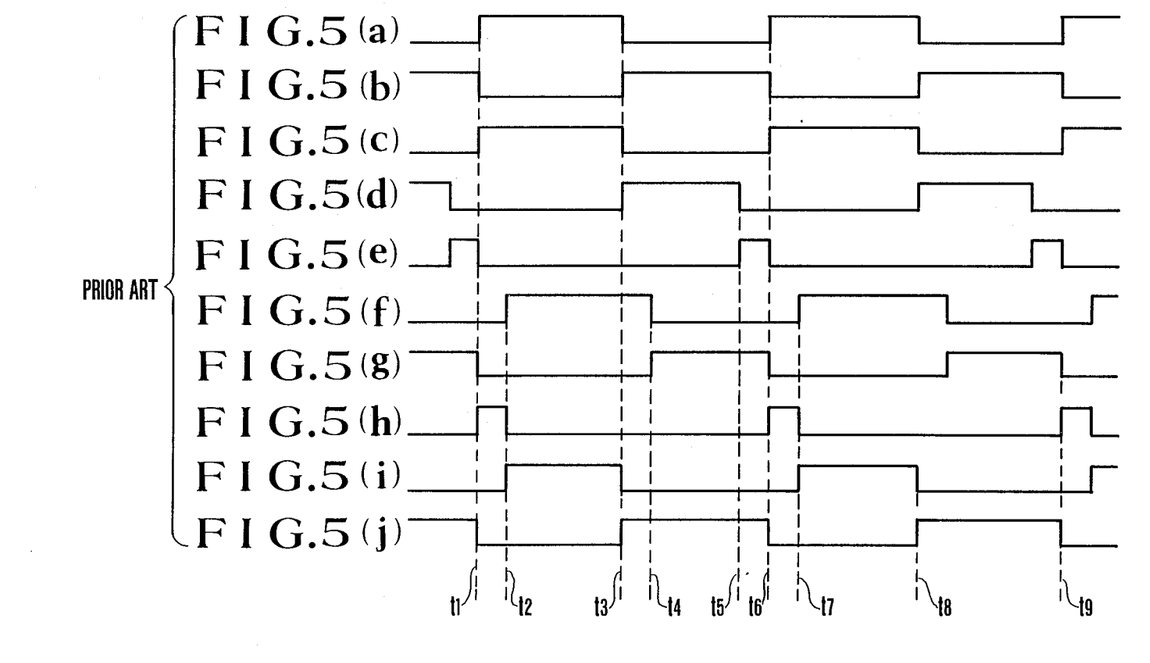

FIGS. 5(a) to 5(j) show in a time chart the recording and reproducing operations of the tape recorder described above. FIG. 5(a) shows a phase detection pulse signal (hereinafter referred to as a signal PG(a)) which is produced in synchronism with the rotation of the rotary cylinder 2 in the form of a rectangular wave form of 30 Hz alternately repeating a high level and a low level (hereinafter referred to as H and L levels respectively) in a cycle of 1/60 sec. FIG. 5(b) shows a pulse signal (hereinafter referred to as a signal PG(b)) of the polarity opposite to that of the signal PG(a). The signal PG(a) remains at an H level while the head 3 turns from the point B to the point G of FIG. 3. The PG(b) signal remains at an H level while the head 4 turns from the point B to the point G.

FIG. 5(c) shows a data reading pulse signal obtained from the PG(a) signal. This signal (c) is used for sampling, for every other field, an audio signal produced during a period corresponding to one field (1/60 sec.) portion of a video signal. FIG. 5(d) shows a signal which is produced at an H level representing a signal processing period for adding the sampled one field portion of the audio signal or data as an error correcting redundant code by means of a RAM or the like or for changing the arrangement of data. FIG. 5(e) shows a signal which is produced at an H level to indicate a data recording period and to show a timing for recording on the tape the data obtained through the above-stated signal processing operation. The temporally flow of signals of FIGS. 5(a)–5(j) are as follows: The data is sampled during a period between points of time t1 and t3 (while the head 3 is shifting from the point B to the point G). The sampled data is subjected to the signal processing operation during a period between points of time t3 and t5 (while the head 3 is shifting from the point G to the point A) and is then recorded during a period between points of time t5 and t6 (or while the head 3 shifts from the point A to the point B). More specifically, the sampled data is recorded into the area CH1 of FIG. 4 by means of the head 3. Meanwhile, the data which is sampled while the signal PG(b) is at an H level is also subjected to the signal processing operation at a similar timing and is recorded into the area CH1 by the other head 4.

FIG. 5(f) shows a signal (hereinafter referred to as a signal PG(f)) which is obtained by phase shifting the signal PG(a) to a predetermined extent (or 36 degrees corresponding to one area). In case that an audio signal is to be recorded by using this signal PG(f) and another signal which is of the polarity opposite to that of the signal PG(f), the apparatus operates as follows: The data sampled during a period between points of time t2 and t4 is signal processed according to a signal shown at FIG. 5(g) and is recorded during a period between points of time t6 and t7 according to a signal shown at FIG. 5(h). In other words, the data is recorded in the area CH2 shown in FIG. 4 by the head 3 while the head 3 is tracing the tape from a point B to another point C. The data which is sampled during points of time t4 and t7 is likewise recorded in the area CH2 by the head 4.

During the period between the points of time t6 and t7 (or between t1 and t2), the signal recorded in the area CH2 is reproduced in the following manner: The head 3 reads data from the tape 1 according to the signal of FIG. 5(h). The data which is thus read is signal processed according to a signal shown at FIG. 5(i) during a period between points of time t7 and t8 (or between t2 and t3) in a manner reverse to the signal processing operation performed during recording. Error correction, etc. are accomplished during this period. A reproduced audio signal which is thus obtained is produced according to a signal shown at FIG. 5(j) during a period between points of time t8 and t9 (or between t3 and t6). Meanwhile, the other head 4 likewise performs a reproducing action at a phase difference of 180 degrees from the above-stated reproducing action of the head 3 to give a continuous reproduced audio signal. For each of other areas CH3 to CH6, the signal PG(a) is phase shifted to a degree of n×36° and recording and reproduction are performed according to the phase shifted signal PG(a) in the same manner as the operations mentioned above. These operations can be accomplished independently of the travelling direction of the tape.

The conventional audio dedicated recording/reproducing apparatus of the kind described is arranged to have many parallel channels. However, this causes the operator a great difficulty in locating recorded or unrecorded parts within each channel on the tape and in avoiding erroneous erasing, etc. In one conceivable method for solving this problem, information on these locations is arranged as additional data and is written into each channel together with PCM audio data. This method, however, requires reproduction of all tracks of all the areas for grasping the recorded condition of the tape and thus takes an extremely long period of time. Further, in preventing a recorded signal from being eroneously erased, the whole track portion of data must be taken in; any error is corrected; the additional data is alone rewritten; again an error correction code is added; and the data after these processes again must be recorded. To meet these requirements, the apparatus must have extremely complex structural arrangement.

Further, in extracting digital recorded data, it is a general practice to extract a bit clock signal used in writing the data and to extract the data by sampling data read out according to the clock signal. As regards the arrangement for extracting the bit clock signal, there is provided a preamble part for bit clock synchronization in front of the data area; and a clock signal which is oscillated by means of a PLL or the like and is synchronized with the clock signal written in this preamble part is employed as the bit clock signal. The conventional method thus necessitates the provision of the preamble part in front of the data to be written in. This deteriorates the efficiency in terms of data recording density. The data recording density, however, must not be lowered particularly in the case where some data relative to the recording condition much be recorded in each of the divided areas as mentioned in the foregoing. Besides, the conventional method requires the use of a bit clock signal extraction circuit, etc. which results in increasing the scale of the circuit arrangement. Further, since it is desirable to adopt a recording data self-clocking arrangement for controlling and monitoring the bit clock signal in extracting the data, the method lowers a degree of latitude in carrying out digital modulation for recording and the density of data recording.

SUMMARY OF THE INVENTION

It is the principal object of this invention to provide an information signal recording and/or reproducing apparatus which is capable of solving the above-stated problems of the prior art.

A more specific object of this invention is to provide an information signal recording and/or reproducing apparatus which is capable of promptly identifying the recorded condition of a plurality of areas extending in parallel with each other on a tape shaped recording medium in the longitudinal direction of the medium.

Under this object, an information signal recording and/or reproducing apparatus which is arranged according to this invention as an embodiment thereof comprises: recording and/or reproducing means for recording or reproducing a main information signal in or from each of a plurality of recording areas extending on a tape-shaped recording medium in the longitudinal direction of the medium; and recording means for recording an additional information signal which relates to all the signals recorded in the plurality of areas, said recording means being arranged to record said additional information signal in a recording track which is formed in the longitudinal direction of the medium separately from the plurality of areas.

Another object of this invention is to provide an information signal recording and/or reproducing apparatus which is capable of applying erroneous erasion preventing means to each individual area of a plurality of areas extending in parallel with each other on a tape-shaped recording medium in the longitudianl direction thereof.

Under that object, an information signal recording apparatus which is arranged according to this invention as another embodiment thereof comprises: (a) first recording head means for recording a main information signal in each of a plurality of areas extenting in the longitudinal direction of a tape-shaped recording medium; and (b) second recording head means for recording in a time sharing manner an additional information signal which relates to all the signals recorded in the plurality of areas.

These and further objects and features of this invention will become apparent from the following detailed description of preferred embodiments thereof taken in connection with the accompanying drawings.

BRIEF DESCRIPTION OF THE DRAWINGS

FIGS. 5(a) to 5(f) show in a timing chart the recording and reproducing operations performed by the recorder of FIG. 3.

FIG. 8A through I is a timing chart showing a recording operation on the longitudinal track formed on the tape-shaped recording medium and on the tracks of audio signals.

DETAILED DESCRIPTION OF THE PREFERRED EMBODIMENTS

Figure 6:
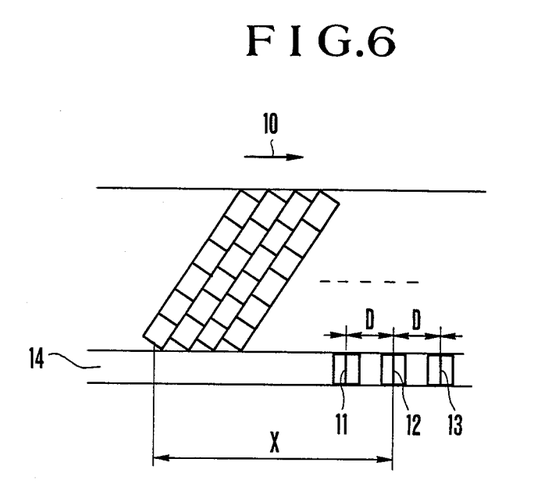
FIG. 6 is an illustration of a positional relation between a longitudinal track formed on a tape-shaped recording medium and recording tracks of audio signals which are handled as a main information signal.

An embodiment of this invention is as shown in FIGS. 6 to 12. Of these drawings, FIG. 6 shows the positions of a reproducing head, an erasing head and a recording head positioned on a longitudinal track formed as an auxiliary track in relation to the above-stated multi-channel audio signal recording track areas. The illustration includes the reproducing head 11; the erasing head 12; the recording head 13; and the track 14 which is formed in the longitudinal direction of the tape. These heads are spaced at a predetermined distance. The erasing head 12 is located at a distance X from the position of an audio track on which a recording operation is to be presently performed.

Figure 7:
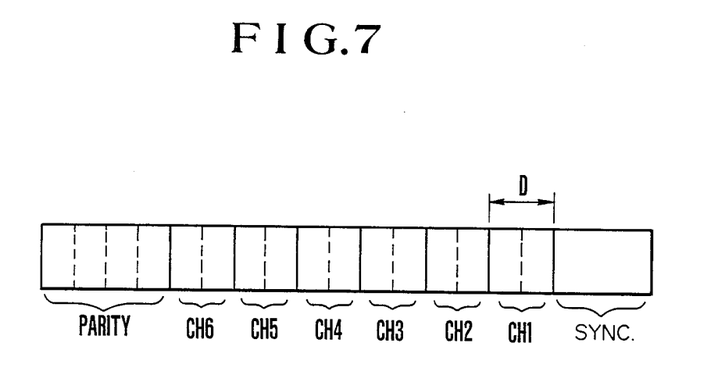
FIG. 7 is an illustration of the recorded condition of the longitudinal track formed on a tape-shaped recording medium.

FIG. 7 shows the forms of data recorded on the longitudinal track 14 of FIG. 6. Assuming that two bits are allocated to each of the six channels, the recorded states of all the channels can be expressed by a total of 12 bits (6 channels×2 bits=12 bits). An example of codes for expressing these recorded states:

00: unrecorded
01: recorded
10: erasure not allowed

The recording length of the information on the recorded state of each channel in the longitudinal track 14 is preferably equal to the head spacing distance D mentioned in the foregoing with reference to FIG. 6, because such arrangement facilitates control. In case that the apparatus cannot have the heads narrowly spaced, the information on the recorded state of each channel becomes obtainable only within a distance of at least 6D or, in terms of time, within a period of at least 6D/v, wherein V represents the travelling speed of the tape. However, this presents no problem for an audio recording apparatus.

To the end of the code is added a check bit, which is provided for some suitable check method such as the CRC check, parity check or the like. With bits arranged in this manner, the data to be recorded consists of 16 bits. The check bit adding method may be replaced with another method in which, instead of adding the check bit, a majority decision is made from among three consecutive data to determine the data of the highest frequency to be true. However, since the recording frequency is relatively low, the data may be used as it is without subjecting it to such a checking process. The data is seldom in error without such a check.

Figure 8:
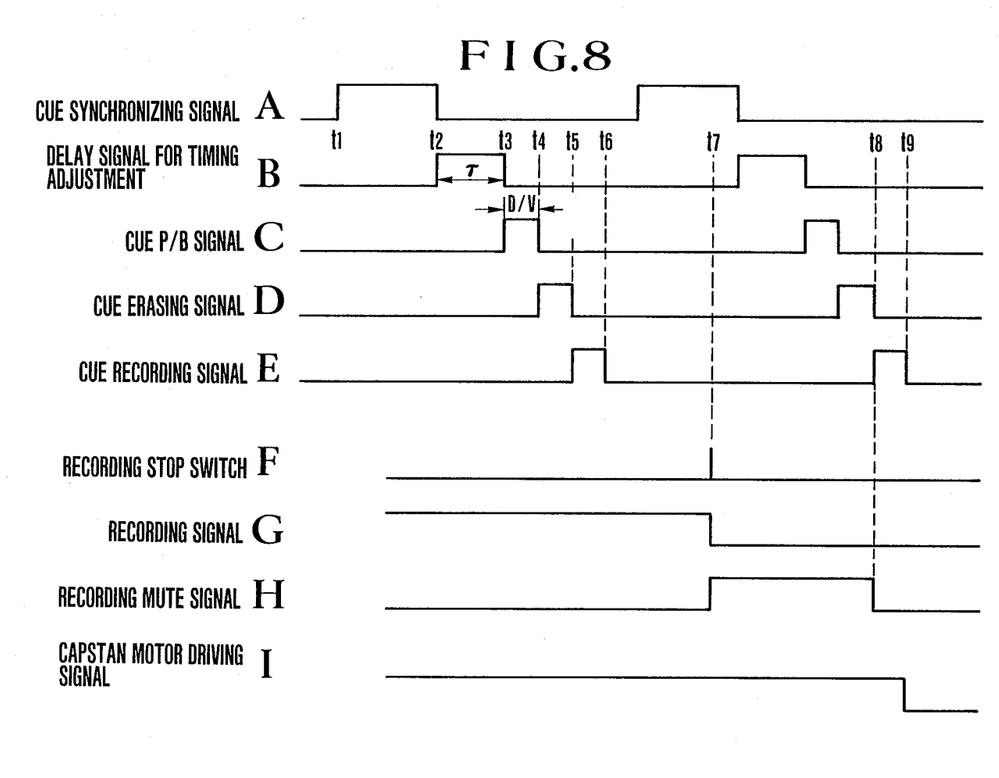

FIG. 8 is a timing chart showing the recording or reproducing operation of the embodiment on the longitudinal track and the audio recording tracks. In FIG. 8, a signal A shows the wave form of a synchronizing signal reproduced by the reproducing head 11. Upon completion of detection of this signal at a point of time t2, a predetermined period of delay time $\tau$ is provided from the time t2 for rewriting a record part of an applicable channel which is presently under an audio signal recording process. Next, during a period between a point of time t3 and another point of time t4, the data of the applicable channel is read by the reproducing head 11 to find whether that channel is recordable. If it is found to be recordable, that part is alone erased by the erasing head 12 which follows the head 11. However, in case that the data thus read is found to be the same as the data to be now recorded, no rewriting is required. Assuming that the predetermined period of time is $\tau = (2D)/v$, for example, the embodiment records the data in the third channel. After that, during a period between points of time t5 and t6, a prescribed code is written in by the recording head 13.

When an instruction is issued for stopping the audio signal recording operation, the embodiment operates as follows: Assuming that a stop switch is pushed at a point of time t7 as shown at a part F of FIG. 8, a recording signal G is stopped from being supplied. Then, a recording muting signal is supplied as shown at a part H of FIG. 8. Meanwhile, upon completion of writing a cue signal at a point of time t9, a motor driving signal is stopped from being supplied. Both a drum or cylinder and a capstan are then stopped from rotating.

Figure 9:
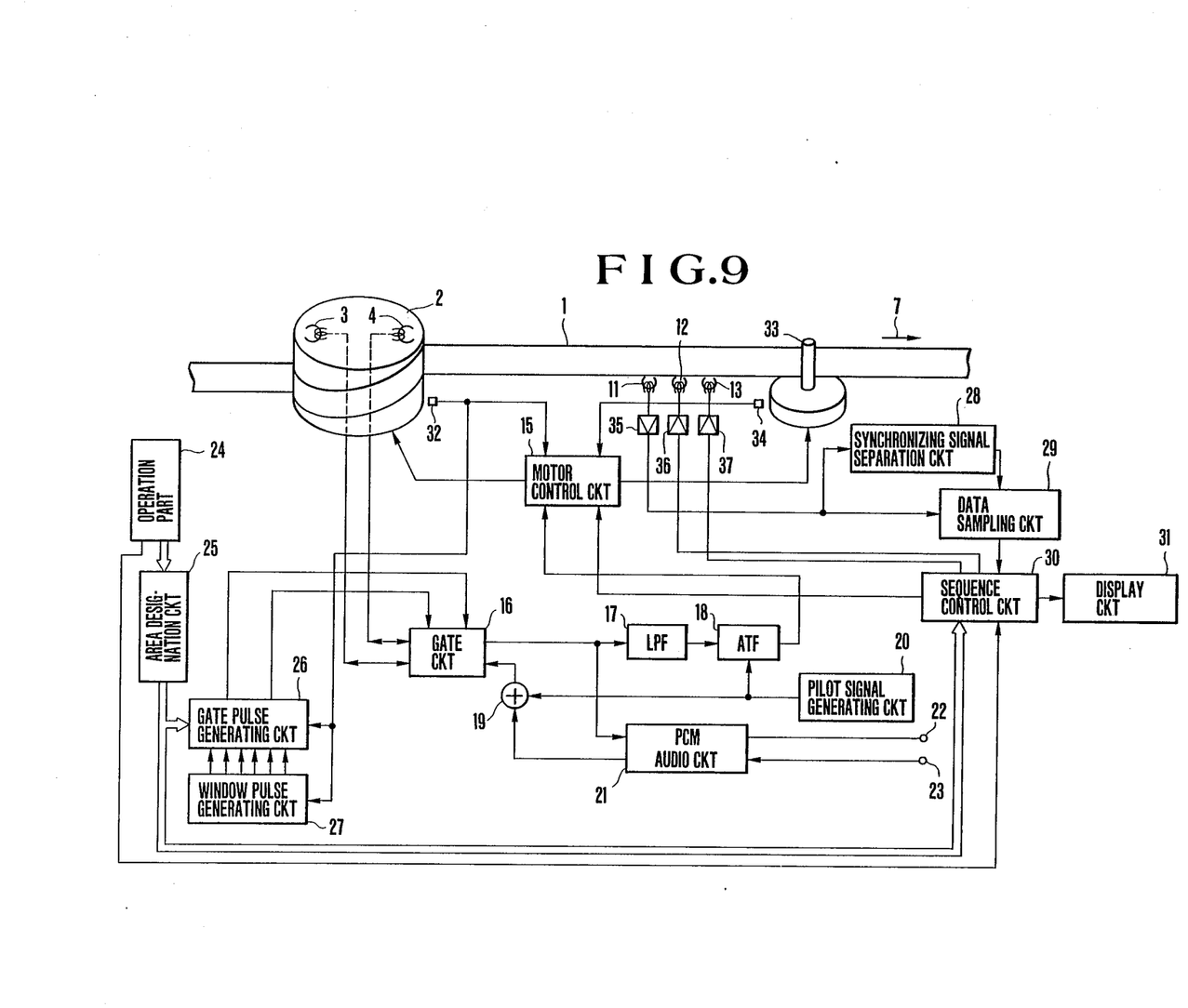
FIG. 9 is a schematic diagram showing the whole arrangement of an apparatus arranged according to this invention as an embodiment thereof.

FIG. 9 shows the whole arrangement of a recording and/or reproducing system as an embodiment of this invention. The illustration includes a reproducing head 11; an erasing head 12; a recording head 13; a motor control circuit 15; an operation part 24; an area designation circuit 25; a synchronizing signal separation circuit 28; a data sampling circuit 29; a sequence control circuit 30; and a display circuit 31. In FIG. 9, reference numerals which are same as those used in FIGS. 1 to 5 denote the same components and parts as those shown in these drawings. The description of gate pulse signal, pilot signal and PCM audio signal systems is omitted from the following description as they are well known. The cue data of a cue signal which is reproduced by the reproducing head 11 and an amplifier 35 is supplied to the synchronizing signal separation circuit 28 and the data sampling circuit 29. The synchronizing signal separation circuit 28 obtains the timing information of the synchronizing signal. The timing information is supplied to the data sampling circuit 29. The circuit 29 separates data for six channels. The cue data which is thus obtained is supplied to the sequence control circuit 30. The sequence control circuit 30 supplies signals via amplifiers 36 and 37 to the cue signal erasing head 12 and the cue signal recording head 13 respectively.

When a track is designated and an instruction for recording or reproduction is issued from the operation part 24, a track designating signal is supplied via the area designation circuit 25 to the sequence control circuit 30 while the instruction for recording or reproduction is supplied directly to the sequence control circuit 30. Upon receipt of these signals, the circuit 30 causes the motor control circuit 15 to control capstan and drum or cylinder motors and also causes the display circuit 31 to display the recorded state of each channel.

Figure 10:
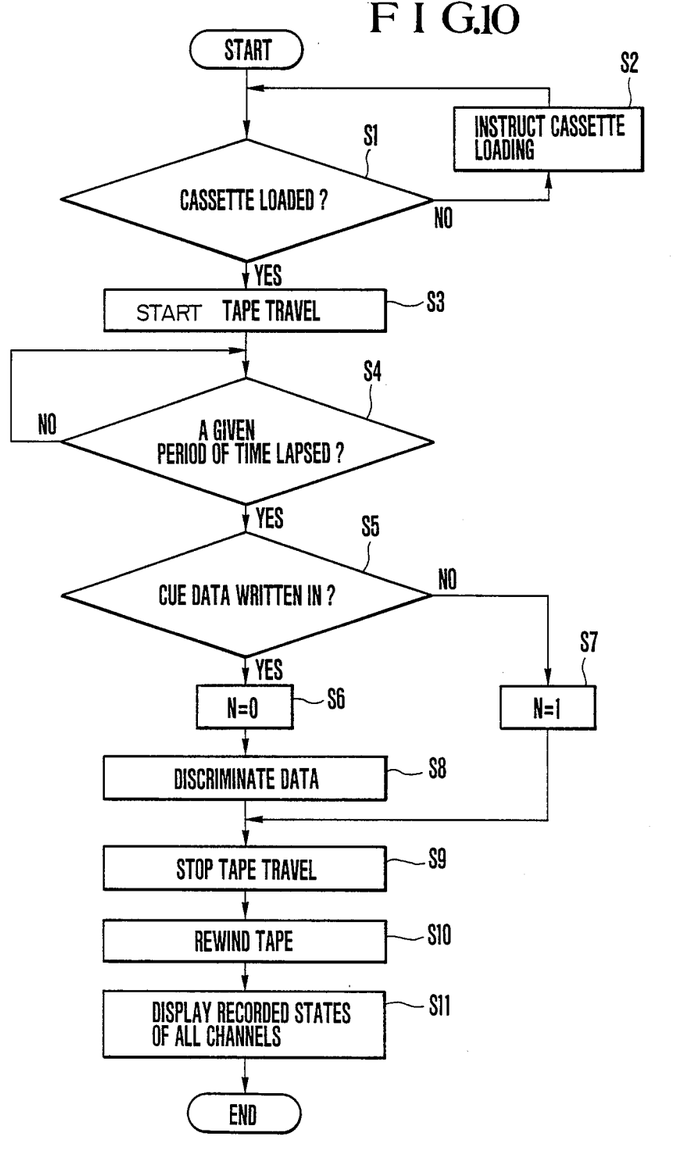
FIGS. 10 and 11 are flow charts showing the operation of a sequence control circuit included in the embodiment of this invention shown in FIG. 9.
Figure 11:
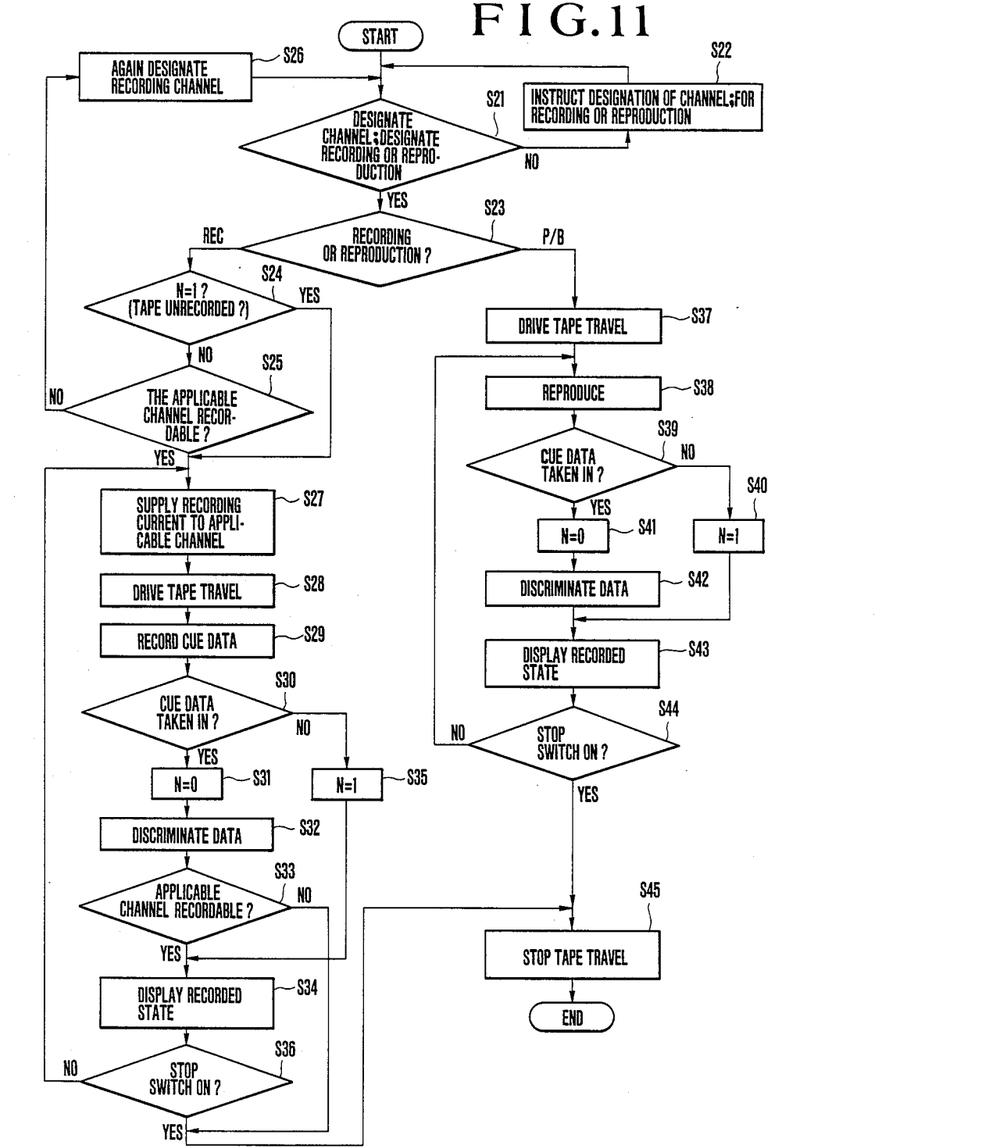

FIGS. 10 and 11 are flow charts showing the system control operation of the sequence control circuit 30. FIG. 10 shows a flow of processes from loading of a cassette to detection of an initial recording condition through a preliminary tape travel. FIG. 11 shows a flow of processes from the channel designation and a recording or reproducing instruction to a point of time at which the stop button is pushed.

Referring to FIG. 10, when the cassette is loaded at a step S1, the tape is driven to travel at a step S3. The tape is preliminarily allowed to travel for a given period of time at a step S4 for the purpose of finding an initial recording condition. If no cassette is loaded, the sequence control circuit 30 produces an instruction for loading the apparatus with a cassette at a step S2. During the tape travel period, if a recorded cue signal is detected at a step S5, the system is set into a state of N=0 at a step S6. The reproduced cue signal or data is discriminated at a step S8. The tape travel is brought to a stop at a step S9. In case that no recorded cue data is detected after the lapse of the given period of time, the tape is judged to be unrecorded and the system is set into a state of N=1 at a step S7 and the tape is brought to a stop. In either case, the tape is rewound back to its initial position at a step S10 after the tape travel is brought to a stop. Then, at a step S11, the recorded states of all the channels is displayed by means of LED's or the like via the display circuit 31. The preliminary operation comes to an end and system is ready for a next operation.

The flow of the recording or reproducing operation of the system is as shown in FIG. 11. In accordance with the recorded state displayed via the display circuit 31, a channel is designated and reproduction or recording from or in the channel is also designated at a step S21. If no designation is made, the designating operation is again performed at a step S22. In case that designation is made for recording at a step S23, a recording operation begins at a step S24 if the display made at the step S11 indicated N=1 (i.e. in the event of an unrecorded tape). However, with the read out cue data discriminated at a step S25, if the result of this discrimination indicates that the applicable channel is covered by an erroneous erasing preventing code, the system waits for designation of another channel at a step S26. In the event of the recording operation, a recording current is supplied at a step S27. A driving action begins to cause the tape to travel at a step S28. A series of cue data recording actions are performed at a step S29. A monitoring action is constantly performed to find any reproduced cue data at a step S30. If the tape has been recorded and any data is reproduced from the recorded tape, the system is set into a state of N=0 at a step S31. Then, at a next step S32, the data is checked to find if the record is erasable. At a step S33, the channel presently under the recording operation is checked to see if the channel is covered with an erroneous erasing preventing code. If the channel is found to be recordable, recording is allowed to continue. Then, the state of this channel is displayed along with the states of other channels at a step S34. In case that the tape has not been recorded and no cue data is obtained as a result of examination made at the step S30, the system is set into a state of N=1 at a step S35 and the recorded states of all the channels are displayed while the recording operation is allowed to continue. If the stop switch is pushed at a step S36, the tape stops from travelling. However, if the stop switch is not pushed at the step S36, the recording operation is resumed and cue data is taken in. Further, if the cue data is found to indicate that the channel under the recording operation is not recordable at the step S33, the travel of the tape is brought to a stop at a step S45.

Meanwhile, in case that a reproduction mode is designated at the step S23, a driving action begins to cause the tape to travel accordingly at a step S37. Then, in the same manner as in the case of recording, the reproducing operation is performed at a step S38 and cue data is taken in at a step S39. If there is found no cue data, the tape is judged to be unrecorded and the system is set into the state of N=1 at a step S40. If cue data is taken in at the step S39, the system is set into the state of N=0 at a step S41. The data which is thus obtained is examined at a step S42. In either of the above-stated two cases, a recorded state is displayed at a step S43. The stop switch is checked to see if it is pushed or not pushed at a step S44. In the event of no input at the stop switch, reproduction is resumed at the step S38 and cue data is taken in at the step S39. However, if a stopping instruction is received from the stop switch, the tape is stopped from travelling at a step S45 and the system await a next operating instruction.

Figure 12:
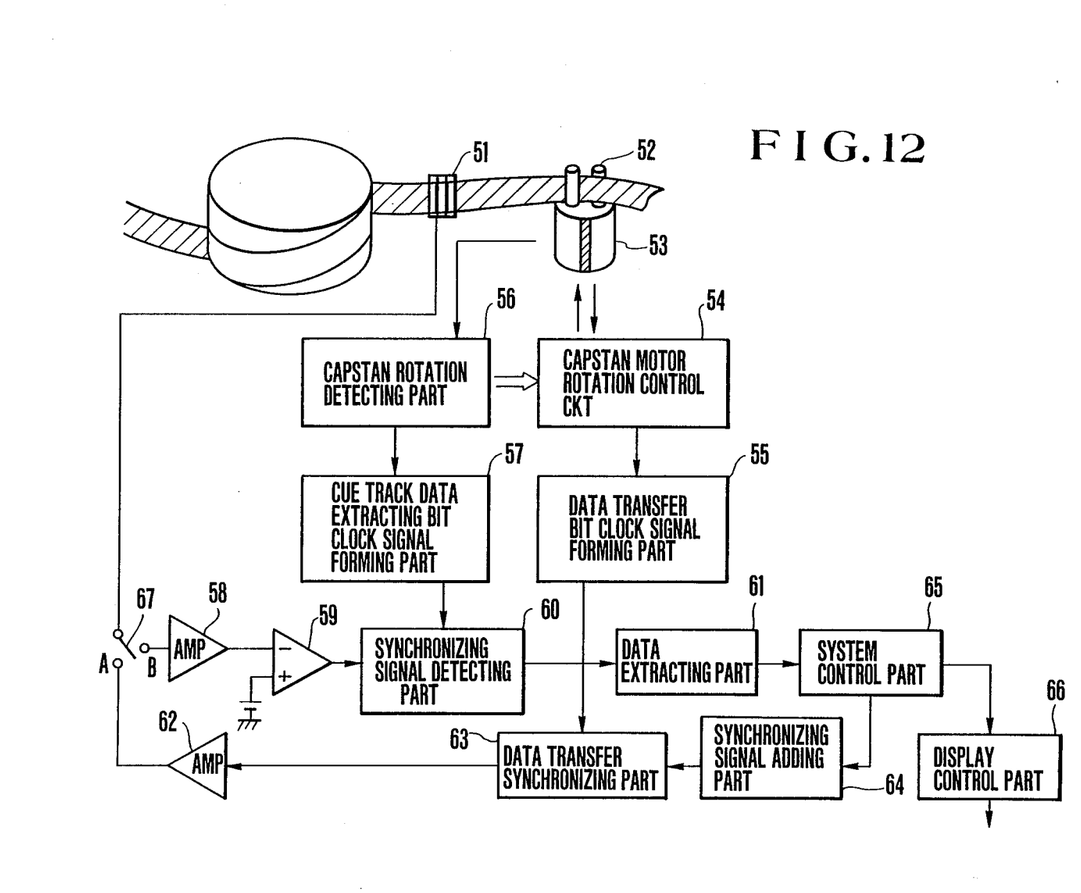
FIG. 12 is a schematic block diagram showing in outline an information reproducing system as an application example of this invention.

FIG. 12 is a block diagram showing by way of example the details of the data reproducing system as a modification example of the embodiment shown in FIG. 9. The illustration includes a fixed head part 51 which consists of heads arranged to perform recording, reproducing and erasing operations on the above-stated longitudinal track 14; a capstan 52; a capstan motor 53; a capstan motor rotation control circuit 54; a data transfer bit clock signal forming part 55; a capstan rotation detecting part 56; a bit clock signal forming part 57 which is arranged to form a bit clock signal for extracting data from the track 14; an amplifier 58 for reproduction; a comparator 59; a synchronizing signal detecting part 60; a data extracting part 61; an amplifier 62 for recording; a data transfer synchronizing part 63; a synchronizing signal adding part 64; a system control part 65; a display control part 66; and a switch 67.

With the embodiment arranged as described above, the capstan rotation detecting part 56 detects the rotation of the capstan motor 53 for controlling the rotation of the capstan 52. The detecting part 56 produces a signal as a result of detection. The detection signal is supplied to the capstan motor rotation control circuit 54. Assuming that the system of FIG. 12 is in a recording state, the switch 67 is connected to on contact A thereof. Then, in accordance with the above-stated detection signal from the capstan rotation detecting part 56, the data transfer a bit clock signal forming part 55 generates bit clock signal corresponding to the rotating speed of the capstan motor 53. Then, data to which a synchronizing signal is added at the synchronizing signal adding part 64 and the clock signal are synchronized with each other at the data transfer synchronizing part 63. The synchronized output of the part 63 is supplied via the amplifier 62 to the fixed head part 51 to be recorded in the track 14 on the tape. This arrangement ensures that the recording start part of the recorded data (the synchronizing signal part of FIG. 7) is in synchronism with the clock signal without fail.

Under the reproducing condition of the system of FIG. 12, the switch 67 is connected to the other contact B. Assuming that the data recorded in the track 14 of FIG. 6 is looked up at a high speed, a synchronizing signal which is located foremost within the reproduced data is detected by the comparator 59 via the reproduction amplifier 58. Meanwhile, the data extracting bit clock signal forming part 57 forms a clock signal according to the above-stated signal which is produced by the capstan rotation detecting part 56. With the clock signal thus produced, as apparent from the foregoing description of the recording mode, the synchronizing signal detected by the comparator 59 coincides with the clock signal produced from the data extracting bit clock signal forming part 57 irrespectively of the tape travel speed employed for the above-stated look-up operation. At the synchronizing signal detecting part 60, the data extracting clock signal is superimposed on the data. The data is extracted at the data extracting part 61 and is supplied to the system control part 65. The display control part 66 then makes a display as necessary.

The arrangement described permits data recording or reproduction at any travelling speed of the tape. The embodiment thus permits high speed data writing and facilitates a high speed look-up operation. Since it is not necessary to extract a clock signal from the reproduced data, the recording format can be set with a wide latitude for increased recording density.

Further the above-stated cue data recording is arranged to be carried out concurrently with audio signal recording. However, the cue data can be changed from an erasing permitting state to an erroneous erasing preventing state.

The information signal recording and/or reproducing apparatus according to this invention which is arranged as described above greatly facilitates maintenance, managing and using operations on the plurality of recording areas extending in the longitudinal direction of a tape-shaped recording medium.

What is claimed is:

1. An information signal recording apparatus, comprising:
   (a) main recording means for recording a main information signal on a tape-shaped record bearing medium;
   (b) subordinate recording means for recording a subordinate information signal on the medium;
   (c) subordinate reproducing means for reproducing said subordinate information signal from the medium;
   (d) more setting means for setting a mode of the apparatus among a plurality of modes, the plurality of modes including first mode where said main recording means records the main information signal and said subordinate reproducing means reproduces said subordinate information signal, and second mode where said main recording means does not record the information signal; and
   (e) control means for controlling said mode setting means so that the mode of the apparatus changes from said first mode to said second mode in response to said subordinate information signal reproduced by said subordinate reproducing means.

2. An apparatus according to claim 1, wherein:
   said subordinate recording means records said subordinate information signal when the apparatus is in said first mode.

3. An apparatus according to claim 1, further comprising moving means for moving said tape-shaped record bearing medium in longitudinal direction thereof, and wherein said moving means moves said tape-shaped record bearing medium at a predetermined speed when the apparatus is in said first mode.

4. An apparatus according to claim 3, wherein:
   said moving means does not move said record bearing medium when the apparatus is in said second mode.

5. An apparatus according to claim 1, further comprising main reproducing means for reproducing said main information signal from the medium, and wherein the plurality of modes includes a third mode where said main reproducing means reproduces said main information signal and said subordinate reproducing means reproduces said subordinate information signal.

6. An apparatus according to claim 1, wherein:
   said subordinate information signal includes a first data which indicates whether erasing of said main information signal is allowed or not, and said control means controls said mode setting means for changing the mode of the apparatus from said first mode to said second mode in response to said first data in said subordinate information signal reproduced by said subordinate reproducing means.

7. An apparatus according to claim 6, wherein:
   said subordinate information further includes a second data which indicates whether said main information signal is recorded on the medium or not.

8. An apparatus according to claim 7, further comprising display means for making a display which indicates whether said main information signal is recorded on the medium or not in response to said second data in said subordinate information signal reproduced by said subordinate reproducing means.

9. An apparatus according to claim 8, wherein:
   said display means is able to make the display when the apparatus is in said first mode.

10. An apparatus according to claim 8, further comprising main reproducing means for reproducing said main information signal from the medium, and wherein the plurality of modes includes a third mode where said main reproducing means reproduces said main information signal and said subordinate reproducing means reproduces said subordinate information signal.

11. An apparatus according to claim 10, wherein:
    said display means is able to make the display when the apparatus is in said third mode.

12. An information signal recording apparatus, comprising:
   (a) main recording means for recording a main information signal on a tape-shaped record bearing medium;
   (b) subordinate reproducing means for reproducing said subordinate information signal from the medium; and (c) prohibiting means for prohibiting the continuation of recording of said main recording means in response to said subordinate signal reproduced by said subordinate reproducing means, said prohibiting means being able to work while said main recording means records the main information signal and said subordinate reproducing means reproduces said subordinate information signal.

13. A signal recording apparatus, comprising:
(a) rotary head arranged to record signals on a first area of a tape-shaped record bearing medium, said first area extending in a longitudinal direction of the medium;
(b) fixed head arranged to reproduce signals from a second area of the medium, said second area extending in the longitudinal direction of the medium parallel with said first area; and
(c) prohibiting means for prohibiting the continuation of recording of said rotary head in response to the signals reproduced by said fixed head, said prohibiting means being able to work while said rotary head records the signal and said fixed head reproduces said subordinate information signal.

* * * * *